(12) United States Patent
Penfornis et al.

(10) Patent No.: US 8,187,374 B2
(45) Date of Patent: May 29, 2012

(54) PROCESS FOR MANUFACTURING CLINKER WITH CONTROLLED $CO_2$ EMISSION

(75) Inventors: Erwin Penfornis, Levallois-Perret (FR); Guillaume De Smedt, Antony (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 314 days.

(21) Appl. No.: 12/513,997

(22) PCT Filed: Oct. 22, 2007

(86) PCT No.: PCT/FR2007/052219
§ 371 (c)(1),
(2), (4) Date: May 7, 2009

(87) PCT Pub. No.: WO2008/056068
PCT Pub. Date: May 15, 2008

(65) Prior Publication Data

US 2010/0000446 A1    Jan. 7, 2010

(30) Foreign Application Priority Data

Nov. 9, 2006  (FR) ...................................... 06 54794

(51) Int. Cl.
*C04B 7/32* (2006.01)
*C04B 7/36* (2006.01)
*C04B 9/11* (2006.01)
*C04B 11/28* (2006.01)
*C04B 28/06* (2006.01)
*F27B 7/00* (2006.01)

(52) U.S. Cl. ......... 106/693; 106/771; 106/745; 432/103
(58) Field of Classification Search .................. 106/693; 432/58, 14
See application file for complete search history.

(56) References Cited

U.S. PATENT DOCUMENTS 3,498,594 A * 3/1970 Rikhof ........................ 106/743
4,183,762 A * 1/1980 Deussner ..................... 106/750
4,541,245 A * 9/1985 Becker et al. ................. 60/648
4,548,580 A 10/1985 Hatano et al.
5,662,050 A 9/1997 Angelo et al.
2005/0060985 A1 * 3/2005 Abanades Garcia et al. ... 60/274
2006/0144297 A1 7/2006 Schwab et al.

FOREIGN PATENT DOCUMENTS

| FR | 2 248 870 | 5/1975 |
| JP | 09 110485 | 4/1997 |
| WO | WO 03/068368 | 8/2003 |
| WO | WO 2004/065849 | 8/2004 |
| WO | WO 2005/059460 | 6/2005 |

OTHER PUBLICATIONS

Metz, Bert. "IPCC Special report on Carbon Dioxide Capture and Storage". Intergovernmental Panel on Climate Change. 2005 [Retrieved online Apr. 27, 2011]. Retrieved from [http://books.google.com/books?id=HWgRvPUgyvQC&dq=ipcc+2005+carbon+capture+and+storage&Ir=&source=gbs_navlinks_s].*
Gronksvit, S. Bryngelsson, M. Westermark, M. "Oxygen Effiency with regard to Carbon Capture". Dec. 2006 [Retrieved Apr. 27, 2011]. Retrieved online [http://www.sciencedirect.com/science?_ob=ArticleURL&_udi=B6V2S-4JRVFS9-2&_user=2502287&_coverDate=12%2F31%2F2006&_rdoc=1&_fmt=high&_orig=gateway&_origin=gateway&_sort=d&_docanchor=&view=c&_searchStrld.*
International Search Report for PCT/FR2007/052219.

* cited by examiner

*Primary Examiner* — Anthony J Green
*Assistant Examiner* — Karam Hijji
(74) *Attorney, Agent, or Firm* — Christopher J. Cronin

(57) ABSTRACT

The invention relates to a process for manufacturing clinker from a raw mix, implementing the following: preheating of the raw mix by combustion flue gases; precalcination of the raw mix; and calcination of the precalcined raw mix in a rotary kiln, in which process the precalcination and the calcination in the rotary kiln produce combustion flue gases that contain $CO_2$, in which the combustion flue gases created by the precalcination undergo a $CO_2$-removal treatment without said flue gases mixing with the combustion flue gases created by the calcination in the rotary kiln.

7 Claims, No Drawings

PROCESS FOR MANUFACTURING CLINKER WITH CONTROLLED $CO_2$ EMISSION

CROSS-REFERENCE TO RELATED APPLICATIONS

This application is a 371 of International PCT Application PCT/FR2007/052219, filed Oct. 22, 2007.

BACKGROUND

The present invention relates to a process for manufacturing clinker enabling $CO_2$ emissions into the atmosphere to be controlled.

Methods for manufacturing clinker are among those industrial processes that emit most $CO_2$, in the same proportions as in the iron and steel industry. Each of them represents the order of 5% of $CO_2$ emissions of man-made origin. This high quantity of $CO_2$ discharge for the cement industry comes not only from the intensive energy consumption in the process for producing clinker, but especially from the reaction for calcining limestone, which emits a very high quantity of $CO_2$ (0.5 tonne of $CO_2$ produced by the mechanism for each tonne of clinker produced). The introduction of new regulations within the framework of the Kyoto protocol requires the various countries that have ratified this protocol to reduce these $CO_2$ emissions, according to fixed objectives per period. Although the short-term objectives seem relatively easy to achieve with primary measures for reducing $CO_2$, the medium and long-term objectives, that are still to be established, could become much more restrictive, especially for industries such as the cement industry. Technological solutions are therefore being currently sought that will enable these future objectives to be achieved for a reasonable cost, that do not endanger the viability of the current sector.

The current solutions envisaged within the context of cement industry installations for reducing their $CO_2$ emissions are of two types. First of all, primary measures that make it possible, for a reasonable cost, to reduce $CO_2$ emissions of the order of a maximum of 15 to 20%; consisting of:
- a reduction in the consumption of carbonaceous fuel (improvement of energy yield, substitution of petroleum coke by natural gas)
- the increased use of alternative fuels, considered as neutral with regard to the $CO_2$ production cycle (biomass, various types of waste)
- the use of substitutes for clinker in the preparation of cement, such as fly ash from thermal power stations and slag from blast furnaces.

Unfortunately, these techniques do not have the potential for generating reductions in $CO_2$ beyond 15 to 20% and very often come up against logistic problems that do not enable these solutions to be totally permanent.

Secondary measures are currently being studied so as to introduce technologies that will permit a reduction in $CO_2$ emissions that is much more massive, above 50%. The technologies envisaged are generally of two types:
- methods for eliminating $CO_2$ from combustion fumes from the process (called "post-combustion"), by washing with amines or by adsorption or liquefaction processes or by membranes,
- oxycombustion methods, making it possible to concentrate the gas flow in $CO_2$, by eliminating nitrogen during the combustion process. In this way, this flow may then be composed virtually exclusively of $CO_2$ (after condensation of the vapor) if combustion air is totally replaced by oxygen, or may then be sufficiently enriched in $CO_2$ (in the case of partial substitution of this combustion air) in order to enable more economic use to be made of technologies for separating $CO_2$.

These secondary methods are for the most part technically proven, often within other application fields, and on more restricted scales, but still with prohibitive costs.

The object of the present invention is to provide a process for manufacturing clinker making it possible for combustion fumes produced by this process to be recovered so as to eliminate $CO_2$ therefrom at a profitable cost.

SUMMARY OF THE INVENTION

To this end, the invention relates to a process for manufacturing clinker from raw material involving:
preheating the raw material by combustion fumes,
precalcining the raw material,
calcining the precalcined raw material in a rotary kiln,
wherein precalcination and calcination in the rotary kiln produces combustion fumes containing $CO_2$, and wherein the combustion fumes created by precalcination undergo a $CO_2$ elimination treatment without said fumes being mixed with the combustion fumes created by calcination in the rotary kiln.

DETAIED DESRIPTION OF THE INVENTION

The three steps of preheating, precalcination and calcination in the rotary kiln of the process according to the invention correspond to the usual process for manufacturing clinker. Primary or raw material mainly consists of limestone and silica. During the first step, this raw material is preheated by combustion fumes, for example by introducing the raw material at the top of cyclones within which the raw material is put into contact with the hot combustion fumes. During the second step, this raw material is precalcined: by the formation of heat by combustion, partial calcination of the preheated raw material is obtained according to the following reaction: $CaCO_3 \text{---} > CaO + CO_2$. The fumes generated during precalcination generally serve to preheat the raw material during the first preheating step. These combustion fumes generally have a $CO_2$ concentration of at least 30% by volume. In the third step, these precalcined materials then continue their path through the rotary kiln, in which they are converted into clinker by means of a reaction between the lime and silica at a very high temperature (>1450° C.). The heat necessary for this third step is provided by combustion in the region of the bottom end of the rotary kiln. This third step also creates combustion fumes containing $CO_2$ in a concentration generally of 15% at most.

According to the invention, the combustion fumes created by the second precalcination step are subjected to a treatment for eliminating $CO_2$ without mixing said fumes with the combustion fumes created by calcination in the rotary kiln. This feature is different from that employed in the prior art, where fumes generated by calcination in the rotary kiln then circulate upstream through the precalcination device and the space for preheating the raw materials, mixing with the combustion fumes coming from precalcination. In the present invention, the calcination fumes in the rotary kiln are not transferred to the precalcination device. On the contrary, they form the object of energy exploitation. The first two steps are thus totally separated from the third step. The combustion fumes created by calcination in the rotary kiln are directly eliminated from the process without entering into contact with the products of the first and second steps.

However, the heat present in the combustion fumes from calcination performed in the rotary kiln may be made use of according to various options. According to a first option, at least part of the combustion fumes created by calcination in the rotary kiln may preheat the raw material in an indirect manner. According to a second option, at least part of the combustion fumes created by calcination in the rotary kiln may preheat the reactants introduced into the rotary kiln in an indirect manner. According to these two options, "indirect manner" is understood to mean that the combustion fumes created by calcination in the rotary kiln are not mixed with the material to be heated and preheating is made through a wall separating the fumes from the material to be heated. Indirect heating according to these two options makes it possible to prevent the mixing of combustion fumes from precalcination and from the rotary kiln according to the invention. Indirect exchange may be made by any type of known heat exchanger between the raw material or the precalcined raw material with the combustion fumes coming from the rotary kiln. According to a third option, at least part of the combustion fumes created by calcination in the rotary kiln may be used in a boiler or a heat-recovery unit.

According to an advantageous variant of the process according to the invention, precalcination of the raw material employs oxycombustion. Oxycombustion is understood to mean combustion employed by means of a fuel and an oxidant having a concentration in oxygen greater than 21%, preferably greater than 25%. Such an oxidant may be a mixture of air and oxygen in suitable proportions. Oxycombustion makes it possible to enrich the combustion fumes in $CO_2$ in the first and second steps. The $CO_2$ concentration in the fumes resulting from this oxycombustion is generally greater than 50% by volume.

According to a preferred embodiment of this variant, the oxidant employed during oxycombustion is pure oxygen. Pure oxygen is understood to mean an oxygenated gas containing at least 90% oxygen. These preferred means employed make it possible to obtain combustion fumes having a $CO_2$ concentration greater than 90% after condensation. Such condensed fumes then require no treatment by a more intensive $CO_2$ elimination process.

They may then be partially recycled in the precalcination step so as to increase the gas flow within the first two steps and to maintain good convective thermal exchange conditions. The invention thus also covers the case where fumes coming from oxycombustion are condensed and the condensed fumes are at least partially recycled in the precalcination of the raw material. Inasmuch as partial calcination of the raw material naturally creates a gaseous effluent rich in $CO_2$, partial enrichment in oxygen of the oxidant for combustion makes it possible rapidly to attain a very high concentration of $CO_2$ in the precalcination fumes.

Implementation of the invention makes it possible to concentrate the combustion fumes coming from the preheating and precalcination zones in $CO_2$. Thus, 50 to 90% of the overall volume of $CO_2$ generated by the cement works may be brought together in the assembly of the precalcination device and the preheater, within a flow of combustion fumes of which the flow rate is less than half that of a cement works according to the prior art. This difference makes the use of processes for eliminating $CO_2$ from combustion fumes much more profitable, even in the current state of technologies, since the elimination processes deal in this way with lower flow rates at higher $CO_2$ concentrations that are generally at least greater than 40% by volume.

According to the variant of the process employing oxycombustion during precalcination, the costs of processes for eliminating $CO_2$ from combustion fumes are much lower by reason of the reduced flow rate of the fumes and their even higher concentration in $CO_2$, which is generally at least greater than 50% by volume.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for manufacturing clinker from a raw material, comprising:
    preheating a raw material by combustion fumes,
    precalcining the raw material, said precalcination producing combustion fumes containing $CO_2$;
    calcining the precalcined raw material in a rotary kiln, said calcination producing combustion fumes containing $CO_2$, wherein the combustion fumes created by precalcination undergo a $CO_2$ elimination treatment without being mixed with the combustion fumes created by calcination in the rotary kiln.

2. The process of claim 1, wherein at least part of the combustion fumes created by calcination in the rotary kiln preheat the raw material in an indirect manner.

3. The process of claim 1, wherein at least part of the combustion fumes created by calcination in the rotary kiln preheat the precalcined raw material introduced into the rotary kiln in an indirect manner.

4. The process of claim 1, wherein at least part of the combustion fumes created by calcination in the rotary kiln is used in a boiler or a heat-recovery unit.

5. The process of claim 1, wherein precalcination of the raw material employs oxycombustion.

6. The method of claim 5, wherein the oxidant employed during oxycombustion is pure oxygen.

7. The method of claim 5, wherein the fumes coming from oxycombustion are condensed and the condensed fumes are at least partially recycled in the precalcination of the raw material.

* * * * *